May 16, 1939.  R. R. EASTIN  2,158,573
TRANSMISSION MECHANISM
Original Filed March 31, 1936  2 Sheets-Sheet 1
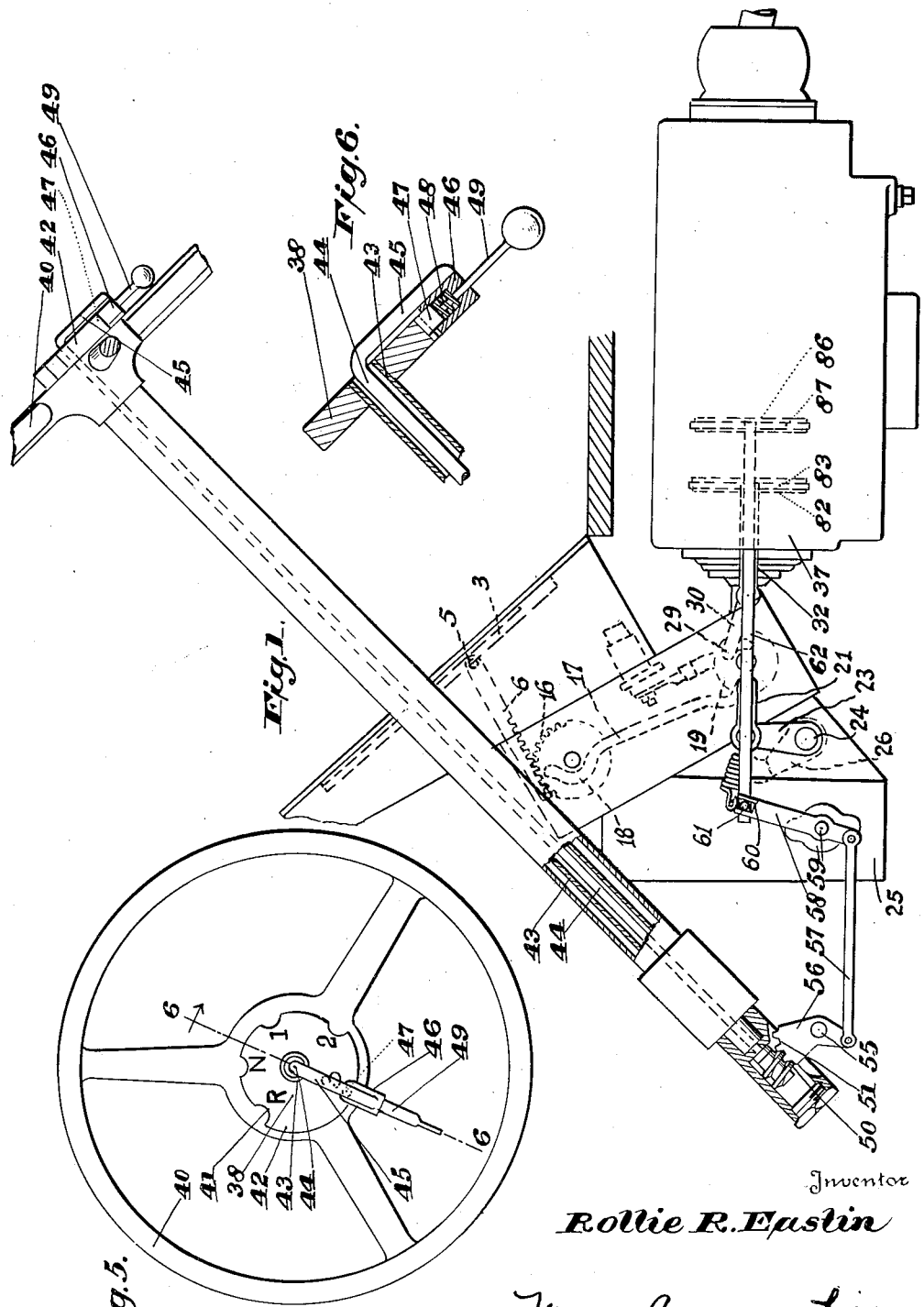
Inventor
Rollie R. Eastin
By Munn, Anderson & Lilly
Attorney

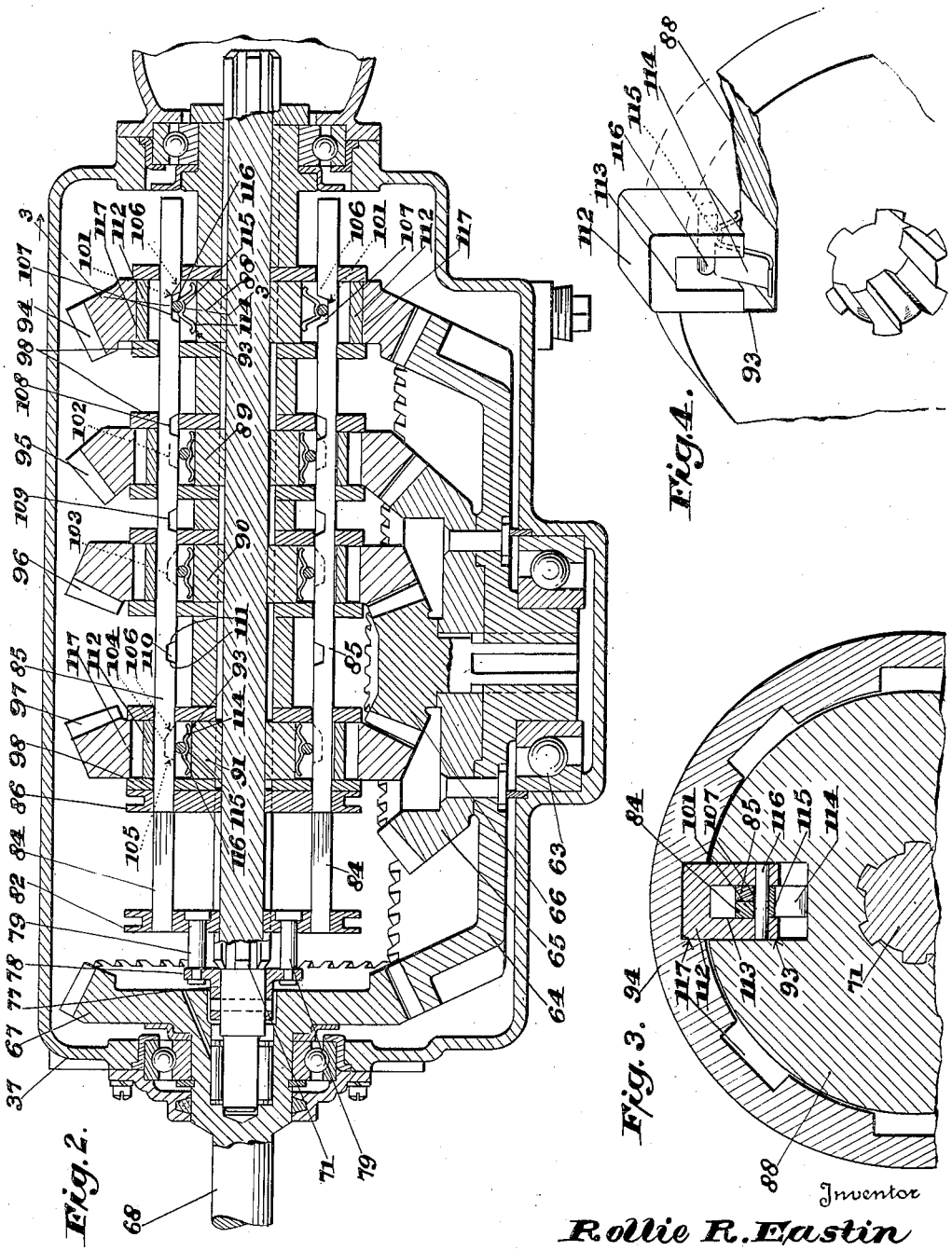

Patented May 16, 1939

2,158,573

UNITED STATES PATENT OFFICE 2,158,573

TRANSMISSION MECHANISM

Rollie R. Eastin, Port Huron, Mich., assignor of five per cent to Jesse C. Castator and Loretta Castator, ten per cent to Walter Burns, ten per cent to Robert A. Gray, Jr., ten per cent to William Burns, and fourteen per cent to Reginald Smith, all of Port Huron, Mich.

Original application March 31, 1936, Serial No. 71,915. Divided and this application November 3, 1936, Serial No. 109,047

4 Claims. (Cl. 74—372)

This invention relates to improvements in transmission mechanisms, and its objects are as follow:

First, to provide a transmission mechanism in which the usual gear shift lever is eliminated from the driver's compartment, thereby increasing the room for and comfort of the front seat passengers as well as increasing the freedom of the driver.

Second, to provide a transmission mechanism in which the speed-change gears are always in mesh with their drivers, only one at a time, however, being coupled with the driven shaft, the others being uncoupled from said shaft, the coupling and uncoupling of speed-change gears being under the control of a turnable finger-piece on the steering wheel.

Third, to provide each of the speed-change gears with a locking key, and selecting means by which any desired one of the locking means is made active to lock the respective gear to the driven shaft.

Other objects and advantages will appear in the following specification, reference being had to the accompanying drawings, in which:

Figure 1 is a combined sectional and elevational view of a structure embodying the invention.

Figure 2 is a vertical longitudinal section of the transmission housing and its contents.

Figure 3 is a detail cross section taken on the line 3—3 of Fig. 2.

Figure 4 is a detail sectional perspective view of one of the gear centers and one of its movable keys.

Figure 5 is a plan view of the steering wheel, showing the shifter dial and finger-piece.

Figure 6 is a detail cross section taken on the line 6—6 of Fig. 5.

This application is a division of an application for patent for Transmission mechanism, filed by Rollie R. Eastin, March 31, 1936, Serial #71,915. The instant application is confined to structure in the transmission, and to the means by which the individual locking keys of the respective speed-change gears are controlled.

The gear release bar 32 is subject to a small amount of reciprocatory movement, and this is produced, according to the original application, by linkage which connects said bar with a clutch pedal 3. Said linkage comprises a rack bar 6 which is connected to the clutch pedal by a pivot pin 5, a gear 16, link 17 which is connected to the gear at 18, a turnable disc 19 and link 30. The adjacent ends of the links 17, 30 are pivotally connected to the disc 19. The link 30 is connected to the bar 32. Another link 21 connects the disc 19 to an arm 23 on a shaft 24 which carries a clutch fork 26. The principle of operation is that when said pedal nears the end of a down-stroke by foot pressure the bar 32 is moved to the left, and when said pedal nears the end of the up-stroke, resulting from letting up pressure on the pedal, said bar is moved to the right. Because of the fact that reciprocation of the bar could be had by means other than the clutch pedal and linkage. The description of the latter is to be regarded only as suggestive of one arrangement.

Before describing the transmission in the housing 37 into which the bar 32 extends, attention is directed to the shifting mechanism which is herein substituted for the conventional gear shift lever. A dial 38 (Fig. 5) is affixed to the upper end of a rigid tube 43 which extends through the steering column and beyond the steering wheel 40. The dial has five peripheral depressions 41 marked 3, 2, 1, N and R as shown, indicating third, second and first speeds, neutral and reverse. The enlargement 42 of the dial 38 provides stops adjacently to the depressions for 3 and N.

A rod 44 extending up through the tube 43 (Fig. 1) is bent into an end 45 (Fig. 6) to which a barrel 46 is attached. This barrel has a recess that confronts the periphery of the dial 38. A latch 47, pressed outwardly by a spring 48, is part of a finger-piece 49 which is actuated by the driver when he selects the various speeds indicated on the dial. The bent end 45 and finger-piece 49 comprise the present substitute for the former gear shift lever, but because of the diminutive size of the elements 45, 49 they appear as nothing more than an ordinary throttle lever.

The lower end of the shift rod 44 carries a worm gear 50 (Fig. 1) in permanent mesh with a gear quadrant 51. The quadrant is journaled on a shaft 55. It has an arm 56 to which one end of a link 57 is pivotally connected. The other end of the link is pivotally connected to a rocker 58 which is mounted on an appropriate bracket 59 which is affixed to the side of a clutch housing (not shown).

At its upper end the rocker 58 is forked at 60 to contain the stud 61 of the shifting bar 62. This bar, like the transmission release bar 32, extends into the transmission housing 37. The two bars are situated side by side.

This housing contains a step bearing 63 (Fig. 2) which supports the largest of three transmission gears 64, 65 and 66. These are drive gears and they revolve continuously as a unit, being connected, as long as the clutch (not shown) is engaged. Driving power for this unit is derived from a pinion 67 which is carried by the drive shaft 68 which extends forwardly into the clutch housing 25 where it is subject to the clutch.

The driven shaft 71 has the sleeve 77 of a circular flange 78 secured to it. The flange has two or more headed studs 79 secured to it so as to project rearwardly in parallelism to each other and to the driven shaft 71. Most of the driven shaft is longitudinally fluted to provide splines for an assemblage of disks, collars and gear centers.

The first of a pair of shiftable disks is the transmission release disk 82. This has an annular groove to contain the forked end 83 of the transmission release bar 32. The operation of this bar will shift the disk 82 into either of the extreme positions, whether at the right or left, on the studs 79 (Fig. 2). This disk is intended to have only the two positions. When in the right position (Fig. 2) it is permissible for the keys to lock the gears. When in the left position the keys are neutralized.

Each of a pair of gear release bars 84 is permanently secured at its left end in the disk 82. Said bars lie flat against a pair of shifter bars 85 which begin at a shifter disk 86. The latter disk is annularly grooved to contain the fork 87 of the shifting bar 62. When the shifting bar 62 is moved by operation of the finger-piece 49 (Fig. 1) the disk 86 will take any one of the five possible positions.

Gear centers 88, 89, 90 and 91 are fixed upon the driven shaft 71. The otherwise peripherally smooth faces of said centers have diametrically opposite key recesses 93. The respective gear centers carry the 3rd-speed gear 94, 2nd-speed gear 95, 1st-speed gear 96 and the reverse gear 97.

Facing plates 98 keep the gear centers and the ring or speed-change gears together in sets, the gears having a turning fit upon the centers. The details of the previously mentioned gear release bars 84 are now described. Each bar extends from the disk 82 through the disk 86, all of the gear centers and all of the facing plates, projecting beyond the last of the facing plates at the right (Fig. 2).

Each gear release bar has notches on its inner side, these, reading in the order of the gears, being designated 101, 102, 103 and 104. The notches in the two bars are in confronting relationship. Each notch is rather long, having an abrupt left end 105 and a long incline 106 at its right end.

The shifter bars 85 also have notches on their inner sides which, reading in the order of the gears, are designated 107, 108, 109 and 110. Both ends of each of these notches are abrupt as at 111. The notches of the two sets of bars are adapted to be brought into registration by a release of the foregoing clutch pedal or, more directly to the point here, by a rightward movement of the gear release bar 32.

Because of the fact that each of the change gears is alike in construction, the following description is applied to the 3rd-speed gear 94, the same reference characters being applied to corresponding parts of the other gears. The center 88 of this gear contains a key 112 in each of its recesses 93 (Fig. 3). These keys are in the form of a U so as to provide an internal spring and bar space 113. A heavy leaf spring 114 extends into the respective space, its free ends resting on the bottom of the recess, and the crotch 115 in its mid portion constantly bearing against a cross pin 116 in the key because of the spring tension.

The gear release and shifter bars 84, 85 occupy the space 113 constantly, the keys 112 being radially movable with respect thereto, first inwardly of the recesses 93 in the gear center then outwardly into any diametrical pair of recesses 117 in the change or ring gear 94 so as to lock the gear and its center together. The keys 112 then occupy both sets of recesses in the gear and its center, bridging the dividing line between to do the locking as shown in Fig. 3.

A further and the chief purpose of the cross pins 116 is to cooperate with the notches 101, etc., 107, etc., in the bars 84, 85. When these notches are brought into registration by a relative shifting of the bars (Fig. 7) the springs 114 press the keys 112 into the recesses 117 because of the room that the matched bar-recesses affords. Later, when the bars 84 are shifted relatively to the bars 85 to the clutch-out positions the movement of inclines 106 across the pins 116 moves the latter inwardly to retract the keys 112 from the recesses 117. This releases the rotating gear 94 from its center 88, leaving the latter and the driven shaft 71 idle until the next gear shift.

The operation is readily understood. As previously stated, the gear release bar 32 is adapted to be moved back and forth to shift the transmission release disk from one of its two positions to the other, the innermost position being shown in Fig. 2. Considering this view of the transmission as it stands, the latter is assumed to be operating at 3rd or high speed. The 3rd-speed gear 94 is locked to its center 88 by the keys 112. Consequently the shaft 71 is driven at engine speed, the large gear 64 acting as an idler intermediately of the pinion 67 and gear 94.

As yet it is not possible to move the finger-piece 49 (Fig. 5) from the 3rd-speed position because the abrupt ends 111 of the notches 107 in the shifter bars 85 now occupied by the cross pins 116 (Fig. 2) offer an obstruction to more than a slight movement of said bars toward the left, corresponding to a slight counter-clockwise turn of the finger-piece (Fig. 5).

Assume it to be desired to shift the transmission mechanism into neutral. It is necessary to first disengage the clutch. After that has been accomplished the gear release bar 32 is moved to the left displacing the disk 82 (Fig. 2) from the position there shown to a position in abutment with the headed studs 79.

This displacement of the disk 82 carries the attached gear release bars 84 to the left. These bars are the ones that have notches 101 to 104. The long inclines 106 of the notches 101 ride over the cross pins 116, retracting the keys 112 from the recesses 117 in the 3rd-speed gear 94 against the tension of the springs 114. The gear 94 continues to revolve but its center 88 and the driven shaft 71 become dormant because of their release.

Turn the finger-piece 49 counter-clockwise to neutral. This causes the rocker 58 (Fig. 1) to turn counter-clockwise. The resulting pull on the shifting bar 62 moves the shifter disk 86 from the 3rd-speed position to the neutral position. All of the notches 107 to 110 in the shifter bars 85 are now out of range of all of the cross pins 116. Consequently it is not possible for the springs 114 to move any of the keys 112 into locking engagement with any of the gears 94 to 97.

Assume that it is next desired to shift into 1st-speed. The clutch is again disengaged, said clutch, presumably, having been reengaged after the foregoing shift to neutral was accomplished. The selection is made by moving the finger-piece 49 (Fig. 5) from neutral to the 1st-speed position. The notches 109 (Fig. 2) would by that act be brought into position over the cross pins 116 of the 1st-speed gear 96. This completes the selection. Now by moving the gear release bar 32 to the right, thereby restoring the transmission release disk 82 to the position shown in Fig. 2, the notches 103 in the bars 84 thereof will come into registration with the notches 109, enabling the keys 112 to enter the first pair of recesses 117 (Fig. 3) that they will encounter, and thus lock the 1st-speed gear 96 to its center 99. This having been accomplished, the operator should let in the clutch, thereby imparting driving power to the shaft 71.

It is to be noted in Fig. 2 that the notches 101, etc. in the gear release bars 84 are at uniform distances from the cross pins 116. All of these notches take positions over the cross pins when the disk 82 is in the innermost position, and all of the same notches are displaced an even distance to one side of the cross pins when said disk is in the extreme left position. But the notches 107 etc. in the shifter bars 85 are progressively farther away from the cross pins 116 of the sets of keys 112 which they control. This is necessary because of the progressive adjustment of the shifter disk 80 in response to the speed selection at the dial 38.

I claim:

1. In transmission mechanism, a driven shaft, a gear center fixed thereon, and having a peripheral recess, a ring gear mounting on said center and having a recess to match the recess therein, a key located in the gear center recess, resilient means adapted to press the key outwardly, said key having a cross pin against which the resilient means bears, a bar extending through the gear center recess and its key, having a notch, and means to shift the bar so as to register the notch with the cross pin thus enabling the resilient means to extend the key from the gear center into a bridging position across said center and gear.

2. Transmission mechanism having a driven shaft and a plurality of driven speed-change gears, an equivalent plurality of gear centers affixed to said shaft for the respective gears, pressure-operable locking means sequestered in the gear centers and adapted to lock each gear to the shaft, a shifter bar transfixing the gear centers and normally suppressing said locking means, said shifter bar having notches spaced progressively farther from the various locking means in a given position of the bar, a release bar also transfixing the gear centers and having notches spaced evenly from the various locking means but progressively farther from the various shifter bar-notches in the first of two positions of the release bar in which its notches do not register with the locking means, means to move the shifter bar along the gear centers with a step motion to advance its notches nearer to the locking means but only one of said notches into registration with one locking means, and means to move the release bar also along the gear centers into the second of its two positions in which its notches do register with the locking means, the matching notches of the two bars enabling such movement of the respective locking means as locks the respective gear to the driven shaft.

3. Transmission mechanism having a driven shaft and a plurality of driven speed-change gears, a gear center fixed on the shaft for each gear, a pair of bars transfixing the gear centers, extending along but externally of the shaft and being revoluble therewith, U-shaped locking means carried by each gear center and being inverted upon contiguous parts of the pair of bars, each bar having notches, shifting means for moving one of the bars for a gear selection, and means for moving the other bar, thereby to match one pair of notches to let the respective locking means lock the selected gear to the respective gear center.

4. Transmission mechanism having a driven shaft and a plurality of driven speed-change gears, a gear center fixed on the shaft for each gear, locking means carried by each gear center, a pair of disks slidable on the shaft and revoluble therewith, means limiting one of the disks to two slid positions, a pair of bars extending along the shaft, each fixed to one of the disks, each bar having notches, shifting means for sliding the other one of the pair of disks and its bar into any one of a number of positions equal to the number of speed-change gears for a gear selection and means for sliding the first-named one disk and its bar thereby to match one pair of notches to let the respective locking means lock the selected gear to the respective gear center.

ROLLIE R. EASTIN.